Patented June 12, 1923.

1,458,339

UNITED STATES PATENT OFFICE.

RANDOLPH B. HANCOCK, OF GARY, INDIANA.

AUTOMATIC FEEDING DEVICE.

Application filed February 20, 1922. Serial No. 537,865.

*To all whom it may concern:*

Be it known that I, RANDOLPH B. HANCOCK, a citizen of the United States, residing at Gary, in the county of Lake and State of Indiana, have invented certain new and useful Improvements in an Automatic Feeding Device, of which the following is a specification.

My invention relates to an automatic feeding device for shearing machines, punch presses, stamping machines or the like and has for its particular object means whereby continuous strips of material are fed into a machine automatically and without any effort on the part of the operator of the machine after the material is started under the shearing mechanism of a machine.

Another object of my invention is the provision of a feeding mechanism which, while entirely automatic in its action is under the control of the operator at all times and which can be brought out of contact with the work at any time at the will of the operator.

Another object of my invention is the provision of an automatic feeding device which can be quickly and easily adjusted to any machine having a horizontal operating shaft which stamps, punches or shears continuous bars to short lengths.

Another and further object of my invention is the provision of a feeding device which in case a machine should become jammed the machine and feeding mechanism will not become broken or damaged as is the case with the usual automatic feeding device.

Figure 1:
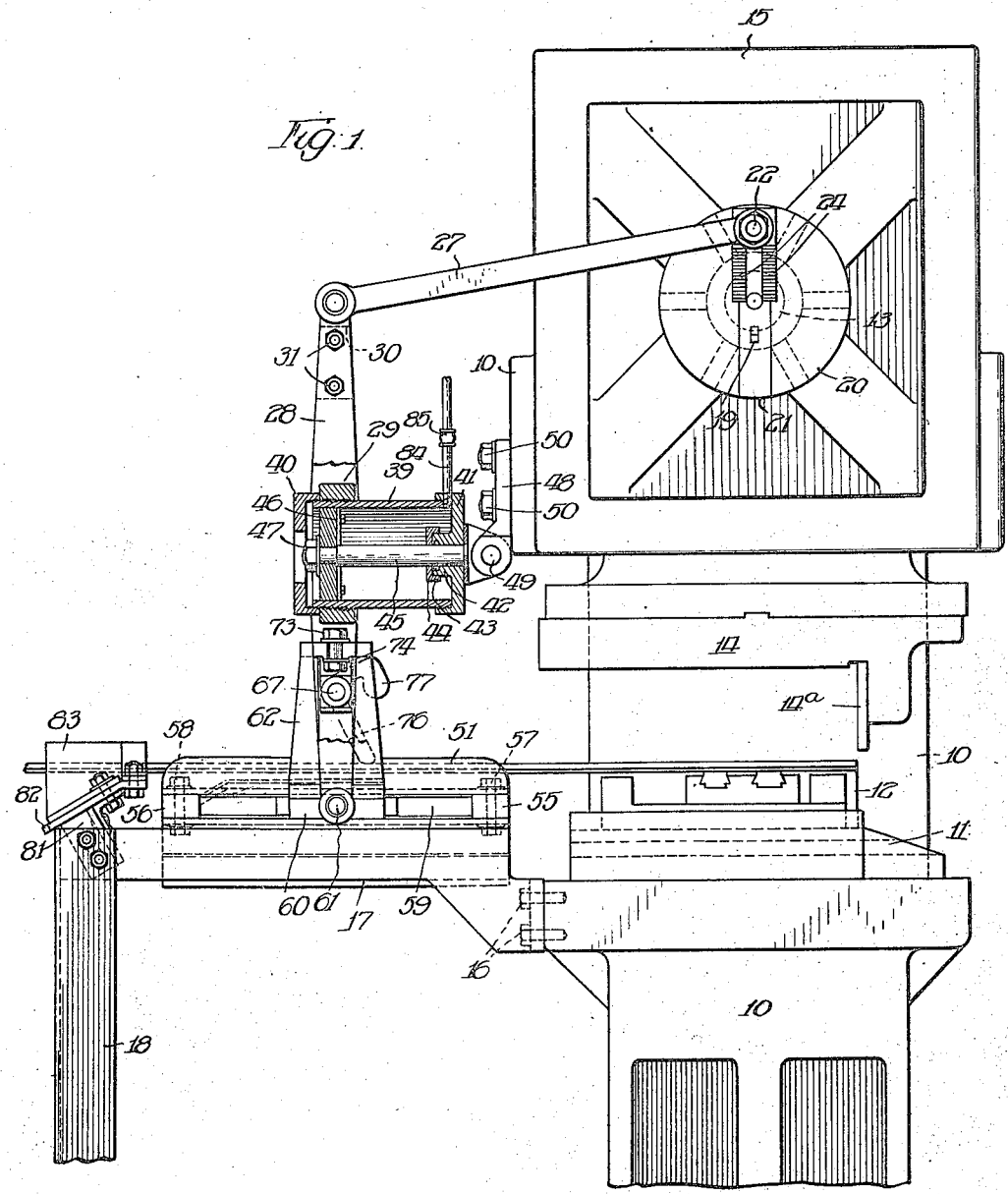
Figure 2:
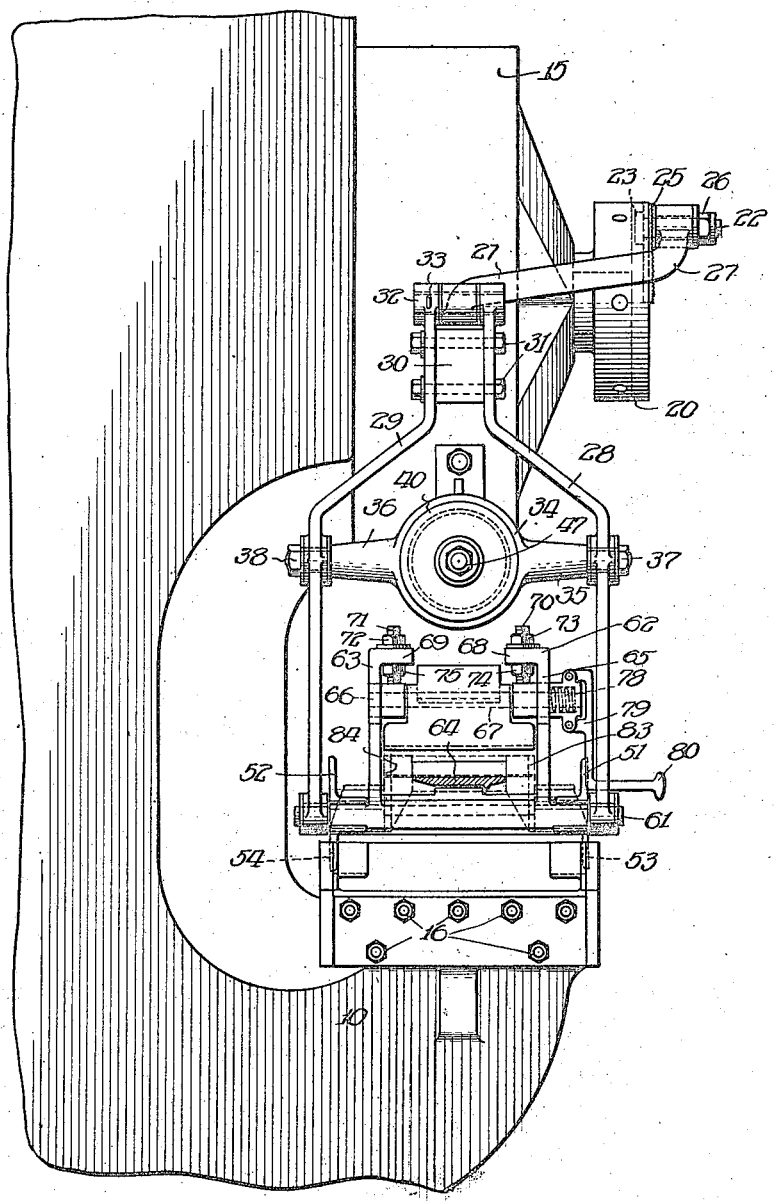

These and other objects of my invention will be more fully and better understood by reference to the accompanying drawings, in which:

Figure 1 is a front view partially in elevation and partially in section of my improved feeding device as applied to a shearing machine; and Figure 2 is a side view in elevation of my improved machine.

Referring now specifically to the drawings, a frame 10 is provided having a work-table 11 with a shearing block 12 secured thereto in any approved manner. To the horizontally extending driving shaft 13 of the machine is secured the usual cutter or punch head 14 in the usual manner, a plate 15 which is secured to the frame 10 of the machine in any manner enclosing the connections between the punch head 14 and the shaft 13. Secured to the frame 10 of the machine by means of bolts 16 is an extension table 17 to the outer end of which supporting legs 18 are secured which rest upon the ground or upon any suitable foundation, the extension 17 forming an operating and supporting table for the feeding mechanism hereinafter described. Secured to the outer end of the shaft 13 by means of a key 19 is a wheel 20 having a slot 21 cast centrally of the wheel 20 within which a bolt 22 is seated, the head 23 of the bolt 22 being seated within the slot 21 extending across the face of the wheel 20. The wheel 20 immediately adjacent the edges of the slot 21 is serrated as at 24, a cooperating serrated washer 25 surrounding the bolt 22 being provided so that the bolt head 23 when the nut 26 is screwed down tightly will be held secured in position. Mounted upon the bolt 22 is an arm 27, to the outer end of which is secured a pair of downwardly extending yoke members 28 and 29 respectively, the said arms having a spacer 30 between them at their upper ends and secured together by means of bolts 31, a pin 32 being provided which extends through the upper ends of the arms 28 and 29 and through the lever 27, the said pin 32 being held in position by means of a key 33.

Centrally located of said arms 28 and 29 is a member 34 having trunnions 35 and 36 which are secured to the arms by means of nuts 37 and 38, the said member 34 being in threaded engagement with the outer end of a cylinder 39, a lock cap 40 being provided which securely holds the member 34 in position on the cylinder 39. The cylinder 39 has a head member 41 secured thereto, the said head member 41 having an inwardly projecting portion 42 to which a gland 43 is secured and having packing 44 therein. A piston 45 is provided which extends through the head 41 and gland 43 and has a head 46 secured thereto and held in position by means of a nut 47, the inner end of the said piston being enlarged and secured to the frame 10 of the machine by means of a bracket 48, a pin 49 extending through the bracket 48 and the enlarged end of the piston 47. Bolts 50, 50 are provided which secure the bracket 48 to the frame 10 of the machine. Secured to the frame member 17 at the opposite sides thereof is a pair of angle members 51 and 52 through angles 53 and 54 being provided between which spacing members 55 and 56 extend, the angles 51 and 53 being held together by means of bolts 57 and 58. Between the angles 51 and 53 a guide-way 59 is formed and within which the lower end of a bracket 60 is positioned, the said bracket 60 being secured to the lower end of the arms 28 and 29 respectively, by means of a pin 61 which extends through the guide-ways formed between the angles 51 and 52 and the angles 53 and 54 respectively. The bracket 60 has a pair of spaced upstanding portions 62 and 63 respectively, between which a strip of material 64 which is fed into the machine is adapted to pass. Mounted in recesses 65 and 66 in the upper ends of the upstanding portions 62 and 63 respectively is a shaft 67. The upper ends of the arms 62 and 63 have portions 68 and 69 with bolts 70 and 71 extending therethrough which, by means of the upper ends 72 and 73 and the lower ends 74 and 75 are adapted to hold the shaft 67 in position in the recesses 65 and 66. The shaft 67 has a feeding dog 76 mounted thereon, the dog 76 having a counterweight portion 77 which is adapted to hold the member 26 securely in contact with the material 64 which is being fed into the shearing press. A torsion spring 78 mounted upon the outer end of the shaft 67 is provided which also serves to hold the latch 76 in position upon the work-piece and allows the latch to swing upwardly if desired. A lever 79 having a handle 80 is also secured to the shaft 67 so that an operator may grasp the handle 80 and bring the latch 76 out of contact with the material being fed into the members at any time desired.

To the outer end of the member 17 is secured a bracket 81 to which a guide member 82 is secured, said guide member extending downwardly and outwardly away from the members so that a guide is formed for the material being inserted into the feeding mechanism prior to the actual operation of the feeding mechanism. A pair of triangular shaped side guides 83 and 84 are provided so that the strip of material 64 can be easily fed into the feeding mechanism. Secured to the cylinder 39 and extending through the wall thereof is a compressed air supply pipe 84 having a three-way valve 85 secured thereto, the said supply pipe 85 leading to any suitable source of compressed air, as an air compressor, so that the cylinder 39 can be supplied with compressed air at all times for the purpose hereinafter described.

In the operation of the device a strip of material 64 is inserted into the machine between the portions 62 and 63 of the bracket 60 and under the cutter head 14, the machine is started in operation and the cutter 14ª descends upon the strip of material 64, making the first cut. As the cutter plate ascends and as soon as there is enough clearance under the cutter head 14 to cause the reduction of the shaft 24 through the operation of the machine, the lever arm 27 will be actuated upon the trunnions 35 and 36 as fulcrums, compressed air having been admitted in the meantime through the supply pipe 84 into the cylinder 39 so that the cylinder will be forced up tightly against the enlarged outside end of the piston. The bracket 60 will thereby be reciprocated in the guide 59 so that the latch 76 will catch upon the top of the strip of material 64 which will be pushed through the machine a predetermined distance, which is controlled by the distance which the bolt 22 is set from the center of the shaft 24 upon the wheel 20, or if it be preferred, a stop can be provided upon the machine and the end of the material pushed against the stock with each cutting operation of the press. As the cutter head 14 decends upon the stock the brackets will be moved backward, the latch in the meantime sliding over the surface of the material so that as soon as the cutting operation is complete the bracket at the lower end of the lever arms 28 and 29 will catch the material and push the strip of material into the shearing machine the required distance, or against the stop, as may be desired. If for any reason the strip of material should become jammed in the machine the lever arms 28 and 29 will thereupon become fulcrumed upon the pin 61 through the yoke 60 and will push the cylinder outward against the compressed air in the cylinder 39 and the machine will continue to operate without damage to any of its parts or to the material which is being fed into the machine, or, if the operator desires, by means of the three-way valve he may exhaust the air out of the cylinder 39 so that as long as the machine will continue to operate the arms 28 and 29 will continue to move upon the fulcrum 61 heretofore described, without in anywise damaging the machine or the material which is being fed therein.

It will also be understood that it is necessary to pivotally mount the piston 45 upon the member 48 because the lower end of the arms 28 and 29 have a parallel motion, and the upper ends of these arms have an oscillating motion, the fulcrum point or cylinder 39 will be slightly oscillated, therefore the pivotal movement of the cylinder is necessary.

It will also be understood that in the operation of a punching machine the stop can be set for the length of the material to be required and any over-feeding will be taken care of by the cylinder being pushed outward over the head of the piston head 46 so that operator can be sure the material is fed into and held securely against the stop. In some cases, it may be desirable to shear and punch the material at the same time, whereupon the same method of operation can be followed, thus insuring that the holes will be punched into the material accurately with each stroke of the press.

While I have described more or less precisely the details of construction, I do not wish to be understood as limiting myself thereto, as I contemplate changes in form and the proportion of parts and the substitution of equivalents as circumstances may suggest or render expedient without departing from the spirit or scope of my invention.

I claim:

1. In combination, a feeding member, a resiliently positioned fulcrum member and means for operatively connecting said member to the operating parts of a machine.

2. In combination, a pivotally mounted feeding member, a resiliently positioned fulcrum member and means for operatively connecting said member to the operating shaft of a metal working machine whereby the feeding member is operated in synchronism with the operating parts of said machine.

3. In combination, a pivotally mounted feeding member, operating connections between said member and the driving shaft of a shearing machine, a cylinder to which said feeding member is fulcrumed, a piston in said cylinder secured to the frame of the machine, and means at the lower end of said feeding member for gripping a work piece.

4. In combination, a pivotally mounted feeding yoke, a table within which the yoke is slidably mounted at its lower end, means carried by said yoke for gripping a work piece, a resilient fulcrum upon which said yoke is mounted, and operating connections between said yoke at its upper end and the driving shaft of a machine.

5. In combination, a pivotally mounted feeding yoke, a table having slides therein within which said yoke is mounted at its lower end, a latch pivotally secured to said yoke, a cylinder upon which said yoke is fulcrumed, a piston in said cylinder secured to the frame of the machine, and operating connections between the said yoke at its upper end and the operating shaft of the machine whereby the said yoke is reciprocated with each revolution of the operating shaft.

6. In combination with a shearing machine, of a pivotally mounted feeding yoke, a cylinder upon which said yoke is fulcrumed, a piston in said cylinder secured to the frame of the machine at its free end, a table having guide ways therein, guide blocks in said guide ways to which the said yoke is secured at its lower end, a latch adapted to grip a work piece, and an operating lever secured to said yoke at its upper end and to the driving shaft of the shearing machine.

7. In combination with a shearing machine, of a pivotally mounted feeding yoke, a cylinder upon which said yoke is fulcrumed, a piston in said cylinder secured to the frame of the machine at its free end, a table having guide ways therein, guide blocks in said guide ways to which the said yoke is secured at its lower end, a latch adapted to grip a work piece, and an operating lever secured to said yoke at one of its ends and adjustably secured to the driving shaft of the shearing machine at its other end.

8. In combination with a shearing machine, of a pivotally mounted feeding yoke, a cylinder upon which said yoke is fulcrumed, a piston in said cylinder secured to the frame of the machine at its free end, a table having guide ways therein, guide blocks in said guide ways to which the said yoke is secured at its lower end, a latch adapted to grip a work piece, a lever secured to said yoke at its upper end, a wheel having a slot therein secured to the driving shaft of the shearing machine and means whereby the operating lever is secured to said wheel in a plurality of positions.

Signed at Gary, Indiana, this 9th day of February, 1922.

RANDOLPH B. HANCOCK.